US012653657B2

(12) United States Patent (10) Patent No.: US 12,653,657 B2
Yu et al. (45) Date of Patent: Jun. 16, 2026

(54) DENTAL BLEACHING GUIDE PLATE AND PREPARATION METHOD THEREOF

(71) Applicant: Sichuan University, Chengdu (CN)

(72) Inventors: Haiyang Yu, Chengdu (CN); Jikui Sun, Chengdu (CN); Yuqiang Zhang, Chengdu (CN); Junjing Zhang, Chengdu (CN)

(73) Assignee: Sichuan University, Chengdu (CN)

( * ) Notice: Subject to any disclaimer, the term of this patent is extended or adjusted under 35 U.S.C. 154(b) by 60 days.

(21) Appl. No.: 18/263,561

(22) PCT Filed: Sep. 21, 2022

(86) PCT No.: PCT/CN2022/120166
§ 371 (c)(1),
(2) Date: Jul. 31, 2023

(87) PCT Pub. No.: WO2023/082844

PCT Pub. Date: May 19, 2023

(65) Prior Publication Data

US 2024/0081968 A1 Mar. 14, 2024

(30) Foreign Application Priority Data

Nov. 11, 2021 (CN) .......................... 202111334408.9

(51) Int. Cl.
*A61C 19/06* (2006.01)
(52) U.S. Cl.
CPC .................................. *A61C 19/066* (2013.01)
(58) Field of Classification Search
CPC ..... A61C 19/066; A61C 19/063; A61C 19/08;
A61C 19/10; A61C 19/04; A61C 13/082;
A61C 5/007; G01J 3/508
(Continued)

(56) References Cited

U.S. PATENT DOCUMENTS 1,371,029 A * 3/1921 Jennings .............. A61C 19/063
604/77
2003/0224318 A1* 12/2003 Weinstein ............ A61C 13/082
433/26
(Continued)

FOREIGN PATENT DOCUMENTS

CN 1368034 A 9/2002
CN 2912556 Y 6/2007
(Continued)

OTHER PUBLICATIONS

International Search Report dated Jan. 3, 2023 in International Application No. PCT/CN2022/120166.

*Primary Examiner* — Heidi M Eide
*Assistant Examiner* — Shannel Nicole Belk
(74) *Attorney, Agent, or Firm* — SALIWANCHIK, LLOYD & EISENSCHENK

(57) ABSTRACT

The present disclosure provides a dental bleaching guide plate, including a first plate and a second plate, wherein the first plate and the second plate are abutted to form an enclosed deep groove structure, the first plate is provided with a guide hole, a spacing between two opposite side surfaces of the first plate and the second plate is greater than an outer diameter of a neck of a tooth, and there is a gap between the side surfaces of the first plate and the second plate and side surfaces of the tooth. The guide plate can be sleeved onto an exterior of a tooth to inhibit a bleaching agent from coming into contact with other teeth. In addition, a range and an amount of applying a bleaching agent can be accurately controlled, partitioned coloration and bleaching can be implemented, and an administration position can be accurately located.

7 Claims, 2 Drawing Sheets

(58) Field of Classification Search
USPC ........................................ 433/26; 700/97–98
See application file for complete search history.

(56)                         References Cited

U.S. PATENT DOCUMENTS

| | | | | |
|---|---|---|---|---|
| 2005/0118549 A1* | 6/2005 | Lehmann | .................. | G01J 3/50 |
| | | | | 433/26 |
| 2008/0274438 A1* | 11/2008 | Schemmer | .......... | A61C 19/063 |
| | | | | 433/80 |
| 2015/0213622 A1* | 7/2015 | Abdulwaheed | .......... | G06T 7/90 |
| | | | | 382/128 |
| 2019/0080451 A1* | 3/2019 | Iglehart | .................. | G01J 3/108 |
| 2021/0369426 A1* | 12/2021 | Wen | ..................... | A61C 17/228 |
| 2023/0144730 A1* | 5/2023 | Lorich | ................. | A61C 19/066 |
| | | | | 264/349 |
| 2024/0081968 A1* | 3/2024 | Yu | .......................... | A61C 19/04 |

FOREIGN PATENT DOCUMENTS

| | | | | | |
|---|---|---|---|---|---|
| CN | 201197748 | Y | 2/2009 | | |
| CN | 103462711 | A | 12/2013 | | |
| CN | 104582631 | A | 4/2015 | | |
| CN | 107278144 | A | 10/2017 | | |
| CN | 113317902 | A | 8/2021 | | |
| CN | 113995540 | A | 2/2022 | | |
| JP | 2004202189 | A | 7/2004 | | |
| JP | 2020178881 | A | 11/2020 | | |
| WO | WO-2020223353 | A1 * | 11/2020 | ......... | A61C 17/0211 |

* cited by examiner

DENTAL BLEACHING GUIDE PLATE AND PREPARATION METHOD THEREOF

CROSS-REFERENCE TO RELATED APPLICATION

This application is the U.S. national stage application of International Patent Application No. PCT/CN2022/120166, filed Sep. 21, 2022, the disclosure of which is incorporated herein by reference in its entirety.

TECHNICAL FIELD

The present disclosure relates to the field of tooth bleaching technologies, and in particular, to a dental bleaching guide plate and a preparation method thereof.

BACKGROUND

Vital tooth bleaching as an effective means to improve intrinsic staining of teeth has been widely used in clinical practice. A vital tooth bleaching agent used for vital tooth bleaching mainly depends on an oxidizing agent in its components to exert a bleaching effect, and a type and concentration of the oxidizing agent affect the bleaching effect. Currently, a main component of the oxidizing agent is hydrogen peroxide, and high permeability of small molecules of hydrogen peroxide leads to different degrees of tooth sensitivity, causing different degrees of damage to dental pulp and periodontal tissues around an affected tooth. In current clinical practice, the vital tooth bleaching agent is usually applied to a tooth by hand. This agent applying method cannot accurately control a range and an amount of applying the agent, affecting a clinical effect and causing postoperative complications to some extent. In addition, the existing agent applying method cannot be used to treat a complex patient for whom different degrees of coloration are needed for different tooth positions.

SUMMARY

A technical problem to be solved by the present disclosure is that an existing method for applying a tooth bleaching agent by hand cannot accurately control a range and an amount of applying the agent, and cannot differentially colorize different tooth positions. The present disclosure is intended to provide a dental bleaching guide plate, and a preparation method and an application of the dental bleaching guide plate to solve the above-mentioned problem.

The present disclosure is implemented using the following technical solutions:

A first objective of the present disclosure is to provide a dental bleaching guide plate, including a first plate and a second plate, where the first plate and the second plate are abutted to form an enclosed deep groove structure, the first plate is provided with a guide hole, a spacing between two opposite side surfaces of the first plate and the second plate is greater than an outer diameter of a neck of a tooth so that the tooth is capable of being sleeved into the deep groove, and there is a gap between the side surfaces of the first plate and the second plate and side surfaces of the tooth.

In one or more embodiments, the side surfaces of the first plate and the second plate are equally spaced from the side surfaces of the tooth.

Optionally, the first plate and the second plate are an integrally molded structure.

A second objective of the present disclosure is to provide a method for preparing the above-mentioned guide plate, including:

S1: obtaining a patient's intraoral model, and colorimetric information for color number contrast between an abutment color and the patient's tooth color;

S2: importing the patient's intraoral model and the colorimetric information into dental design software for digital guide plate design, including:

S201: determining a degree of tooth discoloration based on the colorimetric information to determine a thickness of a bleaching agent needed;

S202: determining a size of a gap between the guide plate and a side surface of a to-be-bleached tooth based on the thickness of the bleaching agent needed, and determining a size of a spacing between a first plate and a second plate based on the intraoral model and the size of the gap between the guide plate and the side surface of the to-be-bleached tooth; and further including:

S203: determining a tooth discoloration region based on the colorimetric information;

S204: determining a desired bleaching region based on information about the degree of tooth discoloration and information about the tooth discoloration region; and S205: determining an opening position and a size of a guide hole based on the bleaching region; and S3: printing the guide plate based on information about the guide plate in S2.

In one or more embodiments, step S2 further includes determining a degree of matching fit between the guide plate and the tooth, and the determining of the degree of matching fit between the guide plate and the tooth is importing data in tooth design software for which the size of the spacing between the first plate and the second plate is determined into three-dimensional reverse engineering software for Boolean operation design of the guide plate.

In one or more embodiments, before step S203, the method further includes: re-importing model data of the guide plate for which the Boolean operation design is performed into the dental design software.

In one or more embodiments, the patient's intraoral model is obtained using an intraoral scanning device; and an abutment color photo is contrasted with the patient's tooth color photo by using an electronic colorimeter to obtain colorimetric information.

In one or more embodiments, the bleaching region includes a position of the to-be-bleached tooth and a bleaching area.

In one or more embodiments, the dental design software is Exocad software and the three-dimensional reverse engineering software is Materialise software.

A third objective of the present disclosure is to provide an application of the above-mentioned guide plate, where the guide plate is configured to partition a to-be-bleached tooth region and administer a bleaching agent quantitatively.

Compared with an existing technology, the present disclosure has the following advantages and beneficial effects:

A dental bleaching guide plate provided in the present disclosure can be sleeved onto an exterior of a tooth, and the guide plate separates a tooth region that needs to be bleached from a non-bleaching tooth region, thereby inhibiting a bleaching agent from coming into contact with other teeth. In addition, a gap is designed between the guide plate and the tooth, a guide hole is provided in the guide plate, a size of the gap is controlled to accurately control an amount of the bleaching agent injected through the guide hole, and the guide plate can be separately sleeved in a plurality of bleaching regions with different degrees of discoloration to perform partitioned bleaching. In this way, a range and an amount of applying a bleaching agent can be accurately controlled, partitioned coloration and bleaching can be implemented, an administration position can be accurately located, postoperative tooth sensitivity can be eliminated, and different degrees of damage to dental pulp of an affected tooth and periodontal tissues around the affected tooth after operation can be eliminated. The dental bleaching guide plate features a simple structure, a simple use method, reusability, and a simple preparation method.

BRIEF DESCRIPTION OF DRAWINGS

To describe technical solutions in example implementations of the present disclosure more clearly, the following briefly describes accompanying drawings needed for embodiments. It should be understood that, the accompanying drawings show merely some embodiments of the present disclosure, and therefore should not be considered a limitation on the scope. A person of ordinary skill in the art may further derive other related drawings from these accompanying drawings without creative efforts. In the drawings.

DESCRIPTION OF EMBODIMENTS

Figure 1:
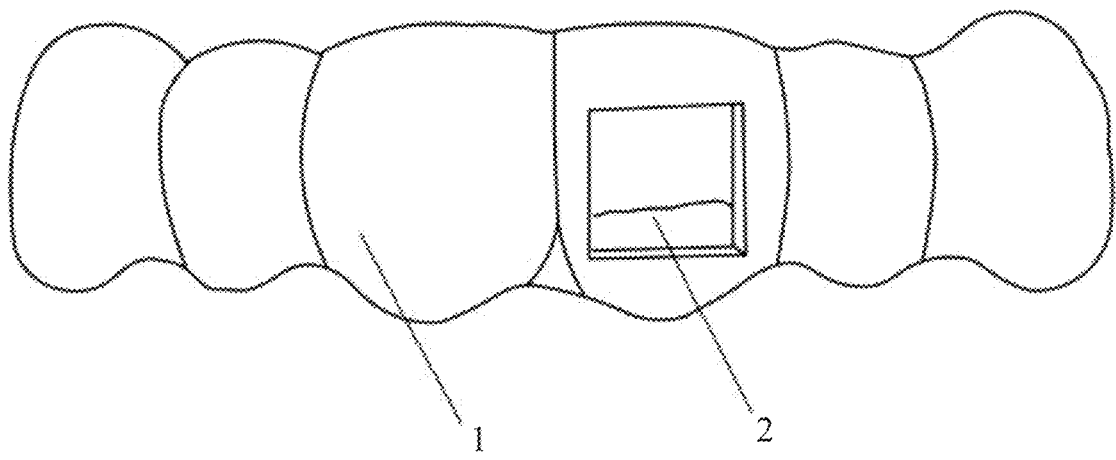
FIG. 1 is a schematic structural diagram of a dental bleaching guide plate according to an embodiment of the present disclosure.
Figure 2:
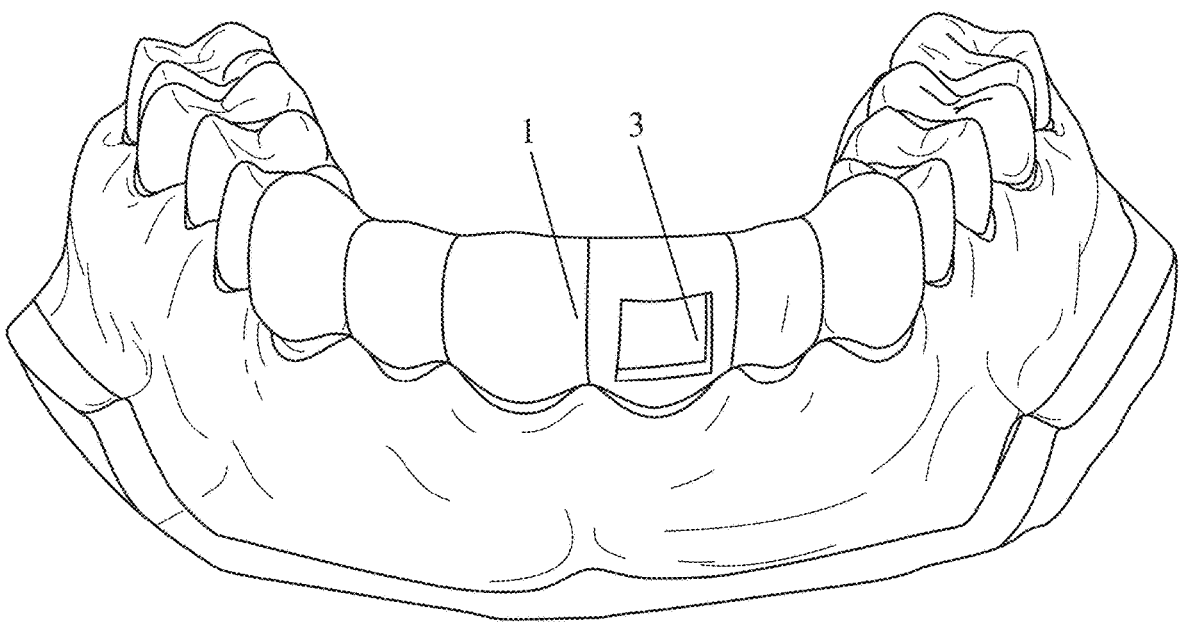
FIG. 2 is a schematic structural diagram of a dental bleaching guide plate sleeved onto a tooth according to an embodiment of the present disclosure.
Figure 3:
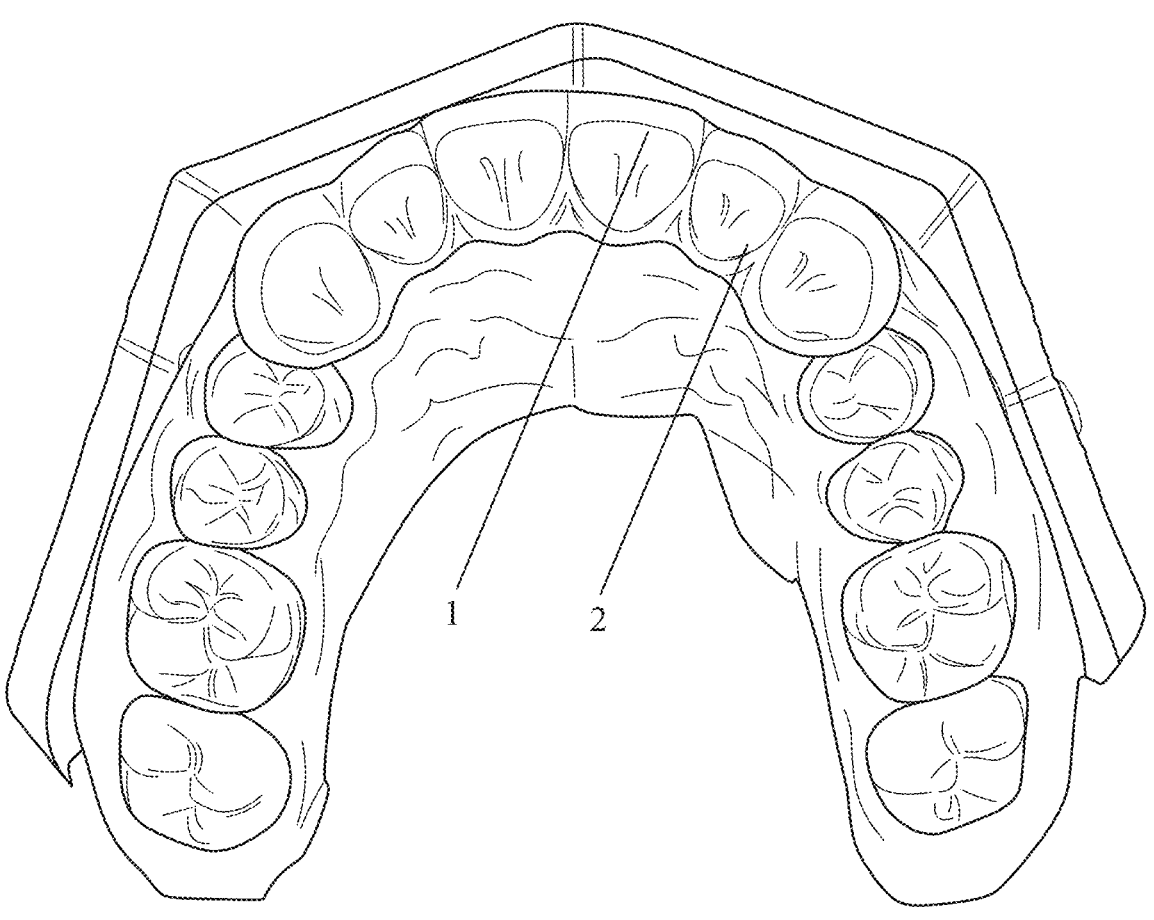
FIG. 3 is a schematic structural diagram of a dental bleaching guide plate sleeved onto a tooth according to an embodiment of the present disclosure.

To make objectives, technical solutions, and advantages of the present disclosure clearer and more comprehensible, the following further describes the present disclosure in detail with reference to embodiments and accompanying drawings. Example implementations of the present disclosure and descriptions thereof are intended merely to explain the present disclosure, and do not constitute a limitation on the present disclosure.

In the following description, numerous specific details are described to provide a thorough understanding of the present disclosure. However, it is obvious to a person of ordinary skill in the art that the present disclosure can be implemented without these specific details. In other embodiments, well-known structures, materials, or methods are not specifically described in order not to confuse the present disclosure.

Throughout the specification, mentioning "one embodiment", "an embodiment", "one example", or "an example" means that a particular feature, structure, or characteristic described with reference to the embodiment or example is included in at least one embodiment of the present disclosure. Therefore, the phrase "one embodiment", "an embodiment", "one example", or "an example" that appears at different locations in the entire specification does not necessarily mean the same embodiment or example. In addition, particular features or characteristics may be combined into one or more embodiments or examples in any suitable combination and/or sub-combination. In addition, a person of ordinary skill in the art should understand that example drawings provided herein are all for illustrative purposes and are not necessarily drawn to scale. The term "and/or" used herein includes any or all combinations of one or more associated listed items.

In the description of the present disclosure, the terms "front", "back", "up", "down", "inside", "outside", and the like are intended merely to facilitate the description of the present disclosure and to simplify the description, and are not intended to indicate or imply that the apparatus or element referred to must have a particular orientation, and be constructed and operated in a particular orientation, and therefore should not be understood as a limitation on the protection scope of the present disclosure.

Embodiment 1

A dental bleaching guide plate includes a first plate 1 and a second plate 2, where the first plate 1 and the second plate 2 are abutted to form an enclosed deep groove structure, the first plate 1 is provided with a guide hole 3, a spacing between two opposite side surfaces of the first plate 1 and the second plate 2 is greater than an outer diameter of a neck of a tooth so that the tooth is capable of being sleeved into the deep groove, and there is a gap between the side surfaces of the first plate 1 and the second plate 2 and side surfaces of the tooth.

Specifically, the first plate 1 and the second plate 2 each have a plate-like structure, and the plate structures of the first plate 1 and the second plate 2 adapt to an outer contour of a dentition formed by arranging a plurality of teeth. Thicknesses, widths, and lengths of the first plate 1 and the second plate 2 may be designed to be equal or unequal, or partially equal based on a size of a tooth in a to-be-bleached region. The first plate 1 and the second plate 2 can be abutted to form an enclosed deep groove structure with one end being open and the other end being closed, so that a contour of the guide plate is a sleeve-type structure, which can be sleeved onto an exterior of a tooth. In this way, the first plate 1 and the second plate 2 are sleeved, along two ends of a length direction, into a tooth groove between two teeth that are farthest from each other in the to-be-bleached region and a tooth in the non-bleaching region. The guide hole 3 provided in the first plate 1 is in communication with the deep groove. A spacing between opposite side plates of the first plate 1 and the second plate 2 is greater than an outer diameter of a tooth having a largest outer diameter of a root portion in the to-be-bleached region. After a tooth is sleeved into the formed deep groove structure, the first plate 1 and the second plate 2 are not completely fitted to an outer side surface of the tooth, but there is a specific gap between each of the first plate 1 and the second plate 2 and the outer side surface of the tooth. In addition, the open end formed by the first plate 1 and the second plate 2 through enclosing extends to a junction between a neck and a gingiva of the tooth, to form a tight sheath for a plurality of teeth in the to-be-bleached region, thereby separating the teeth in the to-be-bleached region from the teeth in the non-bleaching region.

In this way, during tooth bleaching, the guide plate is sleeved onto the exterior of the to-be-bleached tooth, and then a bleaching agent is injected into the gap between the guide plate and the tooth through the guide hole 3. Since the guide plate separates the plurality of teeth in the to-be-bleached region from other teeth that do not need to be bleached, the bleaching agent can be inhibited from coming into contact with other teeth, without causing damage to the tooth region that does not need to be bleached. In addition, the size of the gap can be controlled to control an amount of the injected bleaching agent, so that a specific amount of the bleaching agent is injected based on a desired degree of coloration of the teeth, thereby implementing quantitative and accurate control. In addition, if a plurality of regions need to be bleached, a guide plate having a different gap size, a different length, and a different position and size of the guide hole 3 with respect to the teeth may be designed based on a desired degree of coloration for each region and a size of a coloration region, and be sleeved onto exteriors of teeth in the plurality of regions, and unequal amounts of the bleaching agent are injected into the regions based on the desired degrees of coloration, thereby implementing partitioned bleaching.

In one or more embodiments, the first plate 1 and the second plate 2 are symmetrically disposed, and the side surfaces of the first plate 1 and the second plate 2 are equally spaced from the side surfaces of the tooth. After the bleaching agent is injected into the guide hole 3, the bleaching agent enters the gap so that thicknesses of two parts of the bleaching agent surrounding two side surfaces of the tooth are equal. This ensures that degrees of coloration for teeth in the same bleaching region are the same, and colors of the teeth in the same bleaching region are kept uniform.

Further, the first plate 1 and the second plate 2 are an integrally molded structure.

Embodiment 2

A method for preparing a dental bleaching guide plate includes the following steps:

1. For a patient who needs partitioned external bleaching, after completing clinical diagnosis and indication judgment, a doctor collects a digitized intraoral model of the patient by using an intraoral scanning device or a model scanning device, collects an intraoral tooth color photo of the patient, and contrasts a color number of an abutment color photo with a color number of the tooth color photo of the patient by using an electronic colorimeter, thereby obtaining colorimetric data of the tooth.

2. The colorimetric information is imported into the dental design software Exocad, and an occlusal splint design function is used in the dental design software to load the patient's intraoral model to design and prepare the guide plate.

Details are as follows:

S201: A degree of tooth discoloration is determined based on the colorimetric information. A higher degree of discoloration indicates a larger amount of the bleaching agent needed for bleaching, and a larger thickness of the bleaching agent needed in specific space. A thickness of the bleaching agent needed is determined based on a type of the bleaching agent used.

S202: A size of a gap between the guide plate and a side surface of a to-be-bleached tooth is determined based on the thickness of the bleaching agent needed. A larger thickness indicates a larger gap. A size of a spacing between a first plate 1 and a second plate 2 is determined based on the size of the gap between the guide plate and the side surface of the to-be-bleached tooth, and a size of an outer diameter of each corresponding tooth in the intraoral model. In this way, an amount of the injected bleaching agent is accurately controlled based on the size of the spacing between the first plate 1 and the second plate 2.

Data in the tooth design software for which the size of the spacing between the first plate 1 and the second plate 2 is determined is imported into the three-dimensional reverse engineering software Materialise for designing a Boolean operation for the guide plate and evaluating the degree of matching fit between the guide plate and the tooth, so as to ensure fit between the guide plate and the bleached tooth and inhibit extravasation of the bleaching agent in a non-administration region. If the degree of matching fit between the guide plate and the tooth meets a design requirement, a subsequent step is performed. If the degree of matching fit between the guide plate and the tooth does not meet the design requirement, design parameters including a gap value of the Boolean operation and the like are adjusted until the requirement is met. In this way, overflow of the bleaching agent to periodontal tissues around the affected tooth can be reduced, and damage to the periodontal tissues can be avoided.

Model data of the guide plate for which the Boolean operation design is performed is re-imported into the dental design software.

S203: A tooth discoloration region including a position of the tooth discoloration region and an area of the discoloration region is determined based on the colorimetric information.

S204: A desired bleaching region including a tooth position that needs to be bleached and an area that needs to be bleached is determined based on information about the degree of tooth discoloration and information about the tooth discoloration region.

S205: An opening position of the guide hole 3 and an aperture size of the guide hole 3 are determined based on the bleaching region. Therefore, accuracy of an opening in an operative region is ensured, accurate administration of a specified tooth position and tooth surface region is implemented, extravasation of the bleaching agent in a non-operative region is reduced, and tooth sensitivity, dental pulp tissue damage, and periodontal tissue damage are overall reduced.

After the foregoing steps are performed, structural information and data of each part and each location of the guide plate are determined.

3. The guide plate is printed using a 3D printing technology based on the structural information of each part and each location of the guide plate in step 2.

After the preparation of the guide plate is completed, the operative region of the patient is isolated using a rubber dam and a gingiva sealant. The guide plate is sleeved in the operative region, and it is ensured that the guide plate is in position. Then, bleaching gel is administered and injected into the guide hole 3 under the guidance of the guide plate, and during the injection, it is ensured that there is no extravasation of the bleaching gel and the guide plate does not tilt. After the injection of the bleaching gel is completed, a cold light source is used for a catalytic process of the bleaching gel, and a bleaching treatment course is performed based on a requirement of a bleaching product. In addition, after the use of the guide plate is completed, the guide plate can be sterilized for repeated use.

In terms of application, the dental bleaching guide plate provided in an embodiment of the present disclosure can be configured to partition a to-be-bleached tooth region and administer a bleaching agent quantitatively.

Processes, methods, and devices not mentioned in embodiments of the present disclosure are all known in the art. Details are not described herein.

In the foregoing specific implementations, the objectives, technical solutions, and beneficial effects of the present disclosure are further described in detail. It should be understood that the foregoing descriptions are merely specific implementations of the present disclosure, but are not intended to limit the protection scope of the present disclosure. Any modification, equivalent replacement, or improvement made without departing from the spirit and principle of the present disclosure shall fall within the protection scope of the present disclosure.

What is claimed is:

1. A method for preparing a dental bleaching guide plate, comprising:

S1: obtaining a patient's intraoral model and colorimetric information for color number contrast between an abutment color and the patient's tooth color, S2: importing the patient's intraoral model and the colorimetric information into dental design software for digital guide plate design, wherein designing the digital guide plate design of the bleaching guide plate comprises the steps of:

determining a degree of tooth discoloration based on the colorimetric information to determine a thickness of a bleaching agent needed;

determining a size of a gap between the guide plate and a side surface of a to-be-bleached tooth based on the thickness of the bleaching agent needed, and determining a size of a spacing between a first plate and a second plate based on the intraoral model and the size of the gap between the guide plate and the side surface of the to-be-bleached tooth;

wherein the guide plate comprises the first plate and the second plate, the first plate and the second plate are abutted to form an enclosed deep groove structure, the first plate is provided with a guide hole, the spacing between two opposite side surfaces of the first plate and the second plate is greater than an outer diameter of a neck of the tooth, so that the tooth is capable of being sleeved into the deep groove, and the gap is between the side surfaces of the first plate, the second plate and side surfaces of the tooth;

determining a tooth discoloration region based on the colorimetric information;

determining a desired bleaching region based on information about the degree of tooth discoloration and information about the tooth discoloration region; and determining an opening position and a size of the guide hole based on the bleaching region;

S3: printing the dental bleaching guide plate based on the design of the digital guide plate set forth in S2.

2. The method for preparing the dental bleaching guide plate according to claim 1, wherein the side surfaces of the first plate and the second plate are equally spaced from side surfaces of the tooth.

3. The method for preparing the dental bleaching guide plate according to claim 1, wherein the first plate and the second plate are an integrally molded structure.

4. The method for preparing the dental bleaching guide plate according to claim 1, wherein step S2 further comprises determining a degree of matching fit between the guide plate and the tooth, and the determining of the degree of matching fit between the guide plate and the tooth is importing data in the dental design software for which the size of the spacing between the first plate and the second plate is determined into three-dimensional reverse engineering software for Boolean operation design of the guide plate.

5. The method for preparing the dental bleaching guide plate according to claim 4, further comprising, before determining the tooth discoloration region based on the colorimetric information: re-importing model data of the guide plate for which the Boolean operation design is performed into the dental design software.

6. The method for preparing the dental bleaching guide plate according to claim 1, wherein the patient's intraoral model is obtained using an intraoral scanning device; and an abutment color photo is contrasted with the patient's tooth color photo by using an electronic colorimeter to obtain colorimetric information.

7. The method for preparing the dental bleaching guide plate according to claim 1, wherein the bleaching region comprises a position of the to-be-bleached tooth and a bleaching area.

* * * * *